E. W. FAWCETT, E. W. SILVER & J. DEMING.
Hollow Augers.
No. 143,132. Patented September 23, 1873.
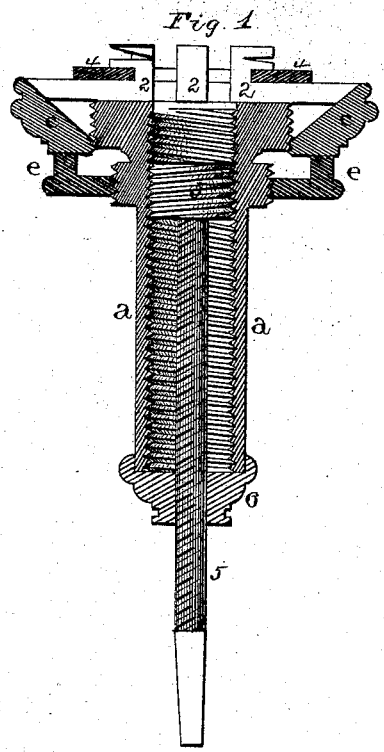
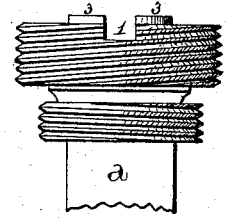
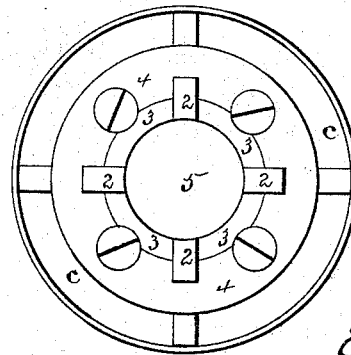
WITNESSES.
H. K. Duhamel
Alex Davidson
INVENTORS.
Edward W. Fawcett
Emmor W. Silver
John Deming
Per H. S. Abbt
Attorney

UNITED STATES PATENT OFFICE.

EDWARD W. FAWCETT, EMMOR W. SILVER, AND JOHN DEMING, OF SALEM, OHIO, ASSIGNORS TO ALBERT R. SILVER AND JOHN DEMING, OF SAME PLACE.

IMPROVEMENT IN HOLLOW AUGERS.

Specification forming part of Letters Patent No. 143,132, dated September 23, 1873; application filed July 28, 1873.

*To all whom it may concern:*

Be it known that we, EDW. W. FAWCETT, EMMOR W. SILVER, and JNO. DEMING, of Salem, county of Columbiana and State of Ohio, have invented certain new and useful Improvements in Hollow Augers, of which the following is a specification:

The nature of our invention relates to an improvement in hollow augers; and it consists in, first, a beveled or flanged rim for adjusting the cutters and blanks, so as to regulate the size of the opening in the cylinder; second, the beveled ends of the cutters and blanks, corresponding to the bevel on the rim, so that by turning the rim against them they will be moved inward, so as to contract the size of the opening, each one maintaining the same relative position; third, a jam-nut, with left-hand thread to tighten against the flanged rim, so as to hold it in position; fourth, an adjustable shank, with a screw-head upon its inner end working in the cylinder, and a finer thread upon its stem, both threads running in the same direction, upon which a jam-nut works, so as to hold and center the shank; fifth, a jam-nut, having a concave recess upon its upper side, so as to receive the end of the cylinder and center the shank in position; and, sixth, in the arrangement and combination of parts, which will be more fully set forth hereafter.

The accompanying drawings represent our invention.

$a$ represents the cylinder, internally screw-threaded its entire length, and having any desired number of recesses 1 formed in its front end, so as to receive the cutters and blanks 2, and in between each recess a projection, 3, which serves to center the annulus or ring 4, which binds the cutters and blanks to the cylinder, allowing them to be moved in and out at will. Around the top of the cylinder is formed a right-hand screw-thread, upon which works the rim $c$, having its inner surface beveled, so as to form an inclined plane, which will correspond to the bevel on the outer ends of the cutters and blanks. By loosening the ring 4, and then screwing the rim upward, this inclined plane, acting on the beveled ends of the cutters and blanks, moves them inward over the opening in the end of the cylinder to regulate its size. By tightening the ring, they will then be secured in the desired position, ready to form tenons upon the ends of spokes and other articles. Just below the thread on which the beveled rim moves is formed another thread, smaller, and running to the left, upon which works a jam-nut, $e$, which screws up against the bottom of the beveled rim, and holds it in position, the ends of the cutters and blanks preventing it from moving upward, and the nut from moving downward. Working in the screw-thread on the interior of the cylinder is the shank 5, having a head formed upon its front end, which regulates the length the tenon is to be cut. The stem of the shank is also threaded, the thread being finer, and running in the same direction as the one on the head, and upon which the jam-nut 6 moves. This nut has a recess formed in its top, which extends over the end of the cylinder, and centers the stem firmly in position.

Having thus described our invention, what we claim is—

1. In a hollow auger, the beveled rim $c$, substantially as set forth.

2. The cutters and blanks, or their equivalents, having beveled ends, in combination with the rim $c$, substantially as shown and described.

3. The jam-nut $e$, having a left-hand thread, in combination with the rim $c$, substantially as shown.

4. The adjustable shank 5, having the thread upon its head and stem running in the same direction, the thread on the stem being finer than the thread on the head, in combination with the jam-nut 6 and cylinder $a$, substantially as set forth.

5. In a hollow auger, the jam-nut 6, having a recess formed in its top for receiving the cylinder $a$, substantially as set forth, constructed and operating to hold the stem 5 in a central position.

6. The combination of the rim, cutting devices having beveled ends, cylinder, shank, and jam-nuts $e$ 6, substantially as set forth.

In testimony that we claim the foregoing as our invention we hereunto affix our signatures this 22d day of July, 1873.

EDWARD W. FAWCETT.
    EMMOR W. SILVER.
    JOHN DEMING.

Witnesses:
    SAMUEL LEWIS,
    R. H. GARRIGUES.